2 Sheets—Sheet 1.

L. HEERY.

Sewing-Machine.

No. 8,499. Reissued Nov. 19, 1878.

Witnesses.

E. J. Bennett

C. J. Mattison

Inventor.

Luke Heery, by

William N. Lord,

Attorney.

L. HEERY.

Sewing-Machine.

No. 8,499. Reissued Nov. 19, 1878.

Witnesses.

E. J. Bennett

C. J. Mattison

Inventor.

Luke Heery, by William H. Low,

Attorney.

UNITED STATES PATENT OFFICE.

LUKE HEERY, OF METHUEN, MASSACHUSETTS.

IMPROVEMENT IN SEWING-MACHINES.

Specification forming part of Letters Patent No. 94,740, dated September 14, 1869; Reissue No. 8,499, dated November 19, 1878; application filed December 26, 1877.

*To all whom it may concern:*

Be it known that I, LUKE HEERY, formerly of Hinsdale, in the county of Berkshire and State of Massachusetts, but now of Methuen, in the county of Essex and State of Massachusetts, have invented a new and useful Polylinear Sewing-Machine, of which the following is a specification:

The object of my invention is to complete at one operation several lines of stitching running in the same general direction, either in straight parallel lines, sinuous lines, or a combination of straight and sinuous lines, the sinuosities being produced by mechanically changing the position of the stitching mechanism in a lateral direction, while the material to be stitched is fed in a direct line to the action of the needles, and the spaces between the several lines being changeable to suit the character of the work.

To effect these objects my invention consists of the mechanism substantially as herein described and claimed.

Figure 1:
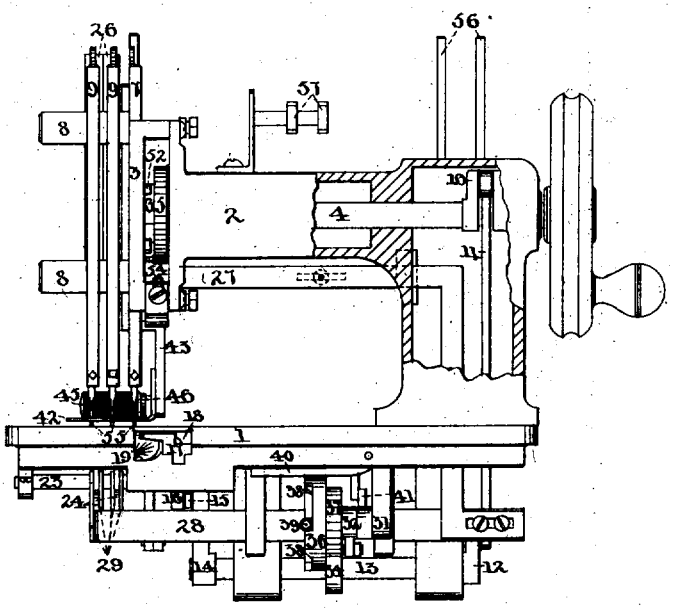
Figure 3:
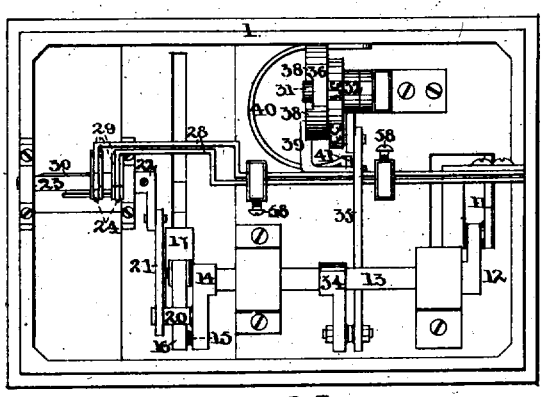
Figure 4:
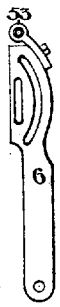
Figure 2:
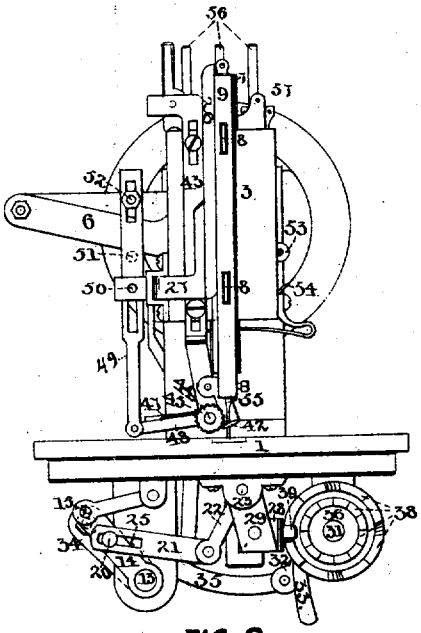
Figure 5:
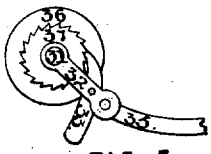
Figure 6:
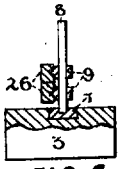
Figure 7:
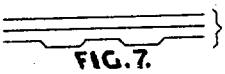

In the accompanying drawings, which form a part of this specification, and to which reference is herein made, Figure 1 is a side elevation of the machine, with a portion of the arm removed to exhibit its contained mechanism; Fig. 2, a front elevation of same; Fig. 3, an inverted plan view of the bed-plate and under work of the machine; Figs. 4, 5, and 6, detached details of several parts; and Figs. 7, 8, 9, and 10, illustrations of a few of the diversified lines of stitching that can be produced by my machine.

As shown in the drawing, the bed-plate 1 of the machine has secured to its upper side the usual sewing-machine arm 2, which is provided at its front end with the face-plate or head 3. Within the arm is the driving-shaft 4, to the front end of which is secured a disk, 5, having a wrist-pin, which engages with a curved slot in the lever 6, said lever being pivoted to an ear on the arm 2, and arranged to vibrate behind the head 3. This lever, which is shown detached in Fig. 4, has also a straight slot formed in it, which engages with a stud on the primary needle-bar, 7, so that the rotations of the driving-shaft 4 impart a reciprocating motion to the needle-bar. On the primary needle-bar are projecting guides 8, for carrying the supplementary needle-bars, 9, which slide freely in a lateral direction thereon, and obtain from them an isochronous reciprocating motion with the primary needle-bar.

The driving-shaft has, near its rear end, a crank, 10, which connects by a rod, 11, with the arm 12 of the rock-shaft 13. This rock-shaft imparts all the necessary movements to the under work of the machine, and is provided with an arm, 14, at its front end, in which there are two wrist-pins. The outer wrist-pin, 15, connects, by the rod 16, to the shuttle-carrier 17. Said carrier slides in the shuttle-race 18, and gives motion to the shuttle 19 in the usual manner. The other wrist-pin, 20, is connected by a rod, 21, to an arm, 22, of another rock-shaft, 23, which rock-shaft operates the loop-hooks 24, for retaining the loops of the needle-thread for forming a "chain-stitch."

In order to produce the proper timing of the movement of the loop-hooks, some provision is necessary whereby they will obtain a momentary rest at each movement of the arm 14. As a simple means for effecting this, a slot, 25, is made in the rod 21, so that the wrist-pin 20 will have sufficient "lost motion" in the slot without producing any movement of the loop-hooks as said arm moves in either direction.

In order to produce an isochronal movement in lateral directions of the supplementary needle-bars and their respective loop-hooks, it is necessary that a connection should be made between these parts in such manner that all of their lateral movements will be coincident. To effect this purpose a separate connection is formed from each guide 26, in which the supplementary needle-bar has its vertical movement. To each guide is attached a bar, 27, which extends back to the standard of the arm, thence downward beneath the bed-plate, where it is joined to a similar bar, 28, extending forward until it reaches the loop-hook corresponding to its needle-bar, at which point it is furnished with ears 29, running up each side of the loop-hook, so as to move it (the loop-hook) in either direction sidewise without interfering with its vibrations as produced by the rock-shaft 23. Said rock-shaft is provided with a "spline" or feather, 30, fitting into a seat cut in each loop-hook, and by this means a vibratory motion of the hook is secured, with perfect freedom for its lateral movements.

The lateral movements of the stitching mechanism are secured in the following manner: A fixed stud or arbor, 31, is secured to the under side of the bed-plate, upon which is placed an arm, 32, carrying a pawl, 33. This arm is vibrated by an arm, 34, on the rock-shaft 13, to which it is connected by a rod, 35. A cam-disk, 36, to which is attached the ratchet-wheel 37, is placed on the stud 31 in such manner that the pawl 33 will engage with the teeth of the ratchet-wheel and rotate the cam-disk with an intermittent motion. The motion derived from the pawl and ratchet-wheel is exactly suited to the character of this work. The cam-disk is provided with projections 38, which may be made of any fanciful form to be reproduced in the line of stitching; and it is obvious that the changes that can be produced in the lines of stitching are mainly dependent upon the infinite variety of outlines that may be given to the projections of the cam-disk. A pin, 39, which is attached to the bar 28, bears against the face of the cam-disk, and is held in close contact with it by means of the spring 40, which presses against a lug, 41, on the bar 28. As the cam-disk rotates, the supplementary needle-bar and its coacting parts are moved, by the means described, to follow the configuration of the projections of the cam-disk. By the use of a separate cam-disk for each supplementary needle-bar, so as to produce an independent motion for each, a different style may be given to each line of stitching, after the manner shown by the different lines illustrated in Figs. 7, 9, and 10; or, when desired, all the rows of stitching may be made in straight lines, as hereinafter described.

The presser-foot mechanism does not differ materially in its construction from similar devices in common use, except in the elongation of the foot-piece 42, to accommodate the increased number of needles, and in providing it with slotted openings to allow for the lateral movements of the needles. Attached to the sliding bar 43 of the presser-foot mechanism is a stud, 44, for carrying the feeding-roller 45, for moving the material to be stitched to the action of the needles. This feeding-roller is rotated on the stud by the following mechanism: A ratchet-wheel, 46, which forms an integral part of the feeding-roller, is arranged to be operated by the spring-pawl 47, attached to an arm, 48, which vibrates on the stud carrying the feeding-roller. To the outer end of this arm is pivoted a sliding rod, 49, which is held in place and guided by a stud, 50, secured to a bracket on the head of the machine, which passes through a slot in the sliding rod. This rod lies in close proximity to the lever 6, and is operated by it to move the feeding device, said lever, on its downward movement, striking a stationary tappet, 51, on the sliding rod, thereby depressing the arm, and carrying back the spring-pawl to re-engage with the teeth of the ratchet-wheel. On its upward movement said lever strikes a movable tappet, 52, on the said sliding rod, and moves the feeding-roller by means of the intervening mechanism. The degree of the movement of the feeding-roller is regulated by adjusting the movable tappet in the slot of the sliding rod, so as to increase or diminish the amount of lost motion of the lever 6 between the two tappets.

The take-up for the upper thread of the primary needle consists of an eye, 53, attached to the outer end of the lever 6, and rendered adjustable by a slotted opening for its attaching-screw. A loop, 54, for guiding the upper thread to the primary needle is attached to the head 3 of the arm, and an eye formed at the upper end of each supplementary needle-bar performs the same duty for the supplementary needles.

All of the needles, 55, are secured to their respective needle-bars in the usual manner, and separate spool-holders 56 and tension-buttons 57 are provided for each needle.

Figure 8:
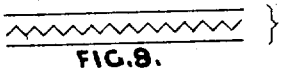
Figure 8:
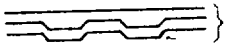
Figure 10:
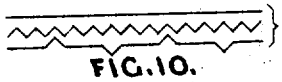

A uniform lateral movement of the supplementary stitching mechanism, to produce uniformity in the sinuosity of their lines of stitching, as illustrated in Fig. 8, may be produced by clamping together their respective bars 27; and straight parallel rows may be produced by securing each supplementary stitching mechanism by means of a set-screw, 58, having a bearing against the bar 28 of each, by which each of these organizations is held in a fixed position, to produce a line of stitching at a given distance from the line produced by the primary needle and its coacting mechanism. The cam mechanism is rendered inoperative by being disengaged while the machine is used for stitching such straight parallel lines.

It will readily be seen that by the action of the feeding-roller, which is made long enough to extend over the entire line of supplementary needle-bars, the material is fed in a direct line irrespective of any devious course that may be given to the lines of stitching, and that each separate line of stitching is complete in itself, and independent of the thread used for forming any other line.

I claim as my invention—

1. In a machine for sewing several separate and distinct lines of stitching, the combination, with the several distinct stitching mechanisms, of the mechanism, substantially as described, for imparting to said stitching mechanisms a lateral movement with respect to the line of the feed, whereby several lines of stitching may be made, one or more of which will be sinuous and parallel to, or of variable sinuosity in respect to each other, essentially as specified.

2. The combination, with a primary needle-bar working in a fixed position, and one or more supplementary needle-bars, each one of which is connected to its respective looping-hook, as set forth, of the mechanism herein described for automatically imparting a lateral movement to the said supplementary needle-bars and looping-hooks, in the manner and for the purpose specified.

3. The combination of the rock-shaft 13, and mechanism for operating the same, arm 14, and rods 16 and 21, with the shuttle-carrier 17, arm 22, rock-shaft 23, and looping-hooks 24, as and for the purpose herein specified.

4. The combination of one or more supplementary needle-bars, 9, looping-hooks 24, and connecting-bars 27 and 28 with the cam-disk 36 and spring 40, as and for the purpose specified.

5. The combination of one or more supplementary needle-bars, 9, looping-hooks 24, and connecting-bars 27 and 28 with the rock-shaft 13, arms 32 and 34, rod 35, pawl 33, ratchet-wheel 37, cam-disk 36, and spring 40, all essentially as herein specified.

LUKE HEERY.

Witnesses:
HENRY TONGUE,
JAMES W. HEERY.